(12) United States Patent
Wu et al.

(10) Patent No.: US 12,425,213 B2
(45) Date of Patent: Sep. 23, 2025

(54) CIPHER ACCELERATOR AND DIFFERENTIAL FAULT ANALYSIS METHOD FOR ENCRYPTION/DECRYPTION OPERATION

(71) Applicant: Nuvoton Technology Corporation, Hsinchu Science Park (TW)

(72) Inventors: Kun-Yi Wu, Tainan (TW); Yu-Shan Li, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 287 days.

(21) Appl. No.: 17/983,575

(22) Filed: Nov. 9, 2022

(65) Prior Publication Data
US 2023/0216677 A1 Jul. 6, 2023

(30) Foreign Application Priority Data
Dec. 30, 2021 (TW) .................................. 110149562

(51) Int. Cl.
*H04L 29/00* (2006.01)
*H04L 9/06* (2006.01)
*H04L 9/32* (2006.01)

(52) U.S. Cl.
CPC . *H04L 9/32* (2013.01); *H04L 9/06* (2013.01)

(58) Field of Classification Search
CPC ... H04L 9/32; H04L 2209/08; H04L 2209/12; H04L 9/0631; H04L 9/004; H04L 9/06
See application file for complete search history.

(56) References Cited

U.S. PATENT DOCUMENTS 4,583,224 A * 4/1986 Ishii ........................ H04L 1/22
714/10
4,627,954 A * 12/1986 Leroy .................... G21C 17/10
376/217

(Continued)

FOREIGN PATENT DOCUMENTS

CN 103618595 A * 3/2014
CN 113260994 A 8/2021

(Continued)

*Primary Examiner* — Don G Zhao
(74) *Attorney, Agent, or Firm* — MUNCY, GEISSLER, OLDS & LOWE, P.C.

(57) ABSTRACT

A cipher accelerator is provided. An encryption and decryption circuit is configured to perform an encryption and decryption operation according to a control signal. The encryption and decryption operation includes a plurality of normal rounds and a plurality of redundant rounds. A controller is configured to provide a control signal to the encryption and decryption circuit according to a first variable value and a second variable value. The encryption and decryption circuit is configured to divide the normal rounds into a first normal section and a second normal section according to the first variable value, and divide the redundant rounds into a first redundant section and a second redundant section according to the second variable value. The encryption and decryption circuit is configured to perform the first normal section, the first redundant section, the second normal section, and the second redundant section sequentially.

10 Claims, 5 Drawing Sheets

(56) References Cited

U.S. PATENT DOCUMENTS

| | | | | |
|---|---|---|---|---|
| 5,016,249 | A | * | 5/1991 | Hurst .................... G06F 11/076 714/24 |
| 5,579,265 | A | * | 11/1996 | Devin .................... G11C 29/24 365/201 |
| 5,774,646 | A | * | 6/1998 | Pezzini ................. G11C 29/70 714/42 |
| 6,278,784 | B1 | * | 8/2001 | Ledermann ............. H04S 1/007 |
| 8,244,405 | B2 | * | 8/2012 | Kao ........................ G05B 15/02 700/286 |
| 2001/0009523 | A1 | * | 7/2001 | Maeno .................... G11C 29/50 365/201 |
| 2005/0165573 | A1 | * | 7/2005 | Takamiya ........ G01R 31/31709 702/127 |
| 2005/0179576 | A1 | * | 8/2005 | Tarui .................... G01R 19/257 341/155 |
| 2007/0014395 | A1 | * | 1/2007 | Joshi ....................... H04L 9/004 380/28 |
| 2010/0083205 | A1 | * | 4/2010 | Ono .................... G06F 30/3312 716/113 |
| 2010/0100799 | A1 | * | 4/2010 | Kurachi .................... G05B 9/03 714/E11.024 |
| 2016/0072621 | A1 | * | 3/2016 | Oshida .................. G06F 21/554 713/194 |
| 2017/0139850 | A1 | * | 5/2017 | Yoon .................... G06F 15/167 |
| 2019/0294486 | A1 | * | 9/2019 | Cheriton ............... G06F 11/079 |
| 2019/0386815 | A1 | * | 12/2019 | Satpathy ................. G06F 7/724 |
| 2020/0210076 | A1 | * | 7/2020 | Murphy ................. G06F 21/30 |
| 2022/0129545 | A1 | * | 4/2022 | Lim ....................... G06F 21/602 |
| 2022/0309190 | A1 | * | 9/2022 | Gopal .................... H04L 9/0643 |
| 2023/0350746 | A1 | * | 11/2023 | Huang ............... G06F 11/0724 |

FOREIGN PATENT DOCUMENTS

| | | | |
|---|---|---|---|
| CN | 114218588 | A * | 3/2022 |
| TW | 201812637 | A | 4/2018 |

* cited by examiner

CIPHER ACCELERATOR AND DIFFERENTIAL FAULT ANALYSIS METHOD FOR ENCRYPTION/DECRYPTION OPERATION

CROSS REFERENCE TO RELATED APPLICATIONS

This Application claims priority of Taiwan Patent Application No. 110149562, filed on Dec. 30, 2021, the entirety of which is incorporated by reference herein.

BACKGROUND OF THE INVENTION

Field of the Invention

The invention relates to a cipher accelerator, and more particularly to a cryptographic accelerator capable of differential fault analysis.

Description of the Related Art

In recent years, encryption and decryption applications have been widely used in various electronic products, and great importance is placed on how to protect confidential information, so as to avoid computing data being stolen and analyzed.

A voltage glitch attack involves rapidly changing the voltage input to the integrated circuit (IC), so that some transistors in the IC will be affected and generate wrong output values in the process of encryption and decryption. This results in the processor operating incorrectly or processing incorrect data. In addition, the information hidden in the IC may also be leaked by the error of the processor.

Therefore, analyzing whether the data in the operation is being attacked is one of the issues that need to be solved in the application of encryption and decryption.

BRIEF SUMMARY OF THE INVENTION

A cipher accelerator and a differential fault analysis method of an encryption and decryption operation are provided. An embodiment of a cipher accelerator is provided. The cipher accelerator includes an encryption and decryption circuit, a controller, a first storage device and a second storage device. The encryption and decryption circuit is configured to perform an encryption and decryption operation according to a control signal. The encryption and decryption operation includes a plurality of normal rounds and a plurality of redundant rounds. The controller is configured to provide the control signal to the encryption and decryption circuit according to a first variable value and a second variable value, so as to control the execution order of the normal rounds and the redundant rounds in the encryption and decryption circuit. The first storage device is configured to store the state of executing the normal rounds. The second storage device is configured to store the state of executing the redundant rounds. The encryption and decryption circuit is configured to divide the normal rounds into a first normal section and a second normal section according to the first variable value of the control signal, and divide the redundant rounds into a first redundant section and a second redundant section according to the second variable value of the control signal. The encryption and decryption circuit is configured to sequentially perform the first normal section, the first redundant section, the second normal section, and the second redundant section.

Moreover, an embodiment of a differential fault analysis method of an encryption and decryption operation is provided. The encryption and decryption operation includes a plurality of normal rounds and a plurality of redundant rounds. A first variable value and a second variable value are obtained from a random number generator. The normal rounds are divided into a first normal section and a second normal section according to the first variable value, and the redundant rounds are divided into a first redundant section and a second redundant section according to the second variable value. The first normal section, the first redundant section, the second normal section and the second redundant section are executed in sequence according to a clock cycle. It is determined whether the encryption and decryption operation was successful based on the first state that is from a first storage device and corresponds to the second normal section and the second state that is from a second storage device and corresponds to the second redundant section.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
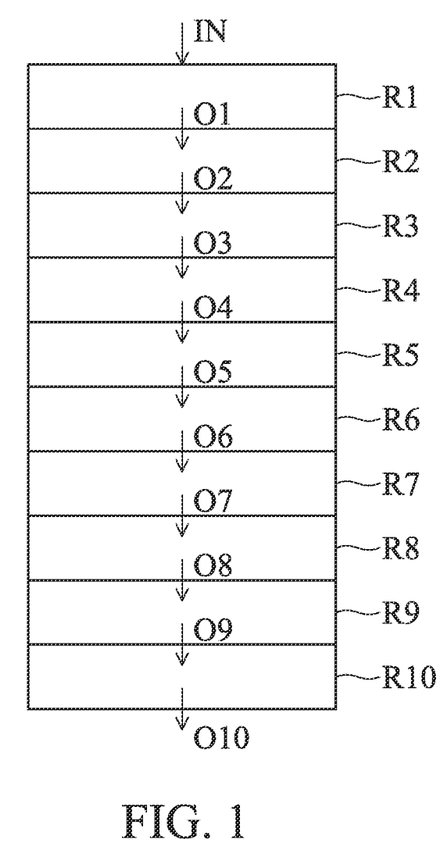
FIG. 1 shows a schematic diagram illustrating the execution of an encryption and decryption (encryption/decryption) algorithm according to some embodiments of the invention.

FIG. 1 shows a schematic diagram illustrating the execution of an encryption and decryption (encryption/decryption) algorithm according to some embodiments of the invention. In some embodiments, the encryption and decryption algorithm may be an advanced encryption standard (AES) algorithm, which is a widely used algorithm that is analyzed by many parties today. In some embodiments, the encryption and decryption algorithm may be a ChaCha algorithm.

In FIG. 1, the encryption and decryption algorithm executes multiple rounds. Additionally, each round uses the same circuit to perform the same or similar operations on the state of the previous round. In FIG. 1, the encryption and decryption algorithm executes 10 rounds R1 through R10. First, according to the input data IN, the first round R1 is executed to obtain the output O1. Next, the output O1 of the first round R1 is substituted into the second round R2 for calculation to obtain the output O2. Next, the output O2 of the second round R2 is substituted into the third round R3 for calculation to obtain the output O3 and substituted into the fourth round R4. By analogy, the fourth round R4 to the tenth round R10 are executed in sequence, and the outputs O4 through O10 are generated respectively. Therefore, after completing the encryption and decryption algorithm with 10 rounds R1 through R10, the final output O10 after the operations are obtained.

In the process of performing encryption and decryption operations in the integrated circuit (IC), differential fault analysis is performed in the normal rounds R1 through R10 and the redundant rounds R1 through R10, so as to determine whether the encryption and decryption process is subject to malicious attacks (such as voltage glitch attacks). First, the normal rounds R1 through R10 (hereinafter referred to as normal rounds NR1-NR10) are executed according to the initial state of the input data, and the normal round output NO10 generated by the normal round NR10 is obtained. Next, the redundant rounds R1-R10 (hereinafter referred to as the redundant rounds RR1-RR10) are executed according to the initial state of the input data, and a redundant round output RO10 generated by the redundant round RR10 is obtained. Next, it is determined whether the normal round output NO10 and the redundant round output RO10 are the same. If the normal round output NO10 is consistent with the redundant round output RO10, it means that the encryption and decryption operation has not failed (that is, the encryption and decryption process has not been attacked). Thus, the normal round output NO10 can be sent to other circuits for subsequent operations. Conversely, if the normal round output NO10 is different from the redundant round output RO10, it means that the encryption and decryption operation is faulty (that is, the encryption and decryption process is attacked). Therefore, the IC will re-execute the normal rounds NR1 through NR10 and the redundant rounds RR1 through RR10 until the normal round output NO10 and the redundant round output RO10 are consistent. In some embodiments, when the normal round output NO10 is different from the redundant round output RO10, the IC will directly finish the encryption and decryption operation, and notify other circuits (e.g., by sending a specific value) that the encryption and decryption process is attacked and the operation fails.

Figure 2:
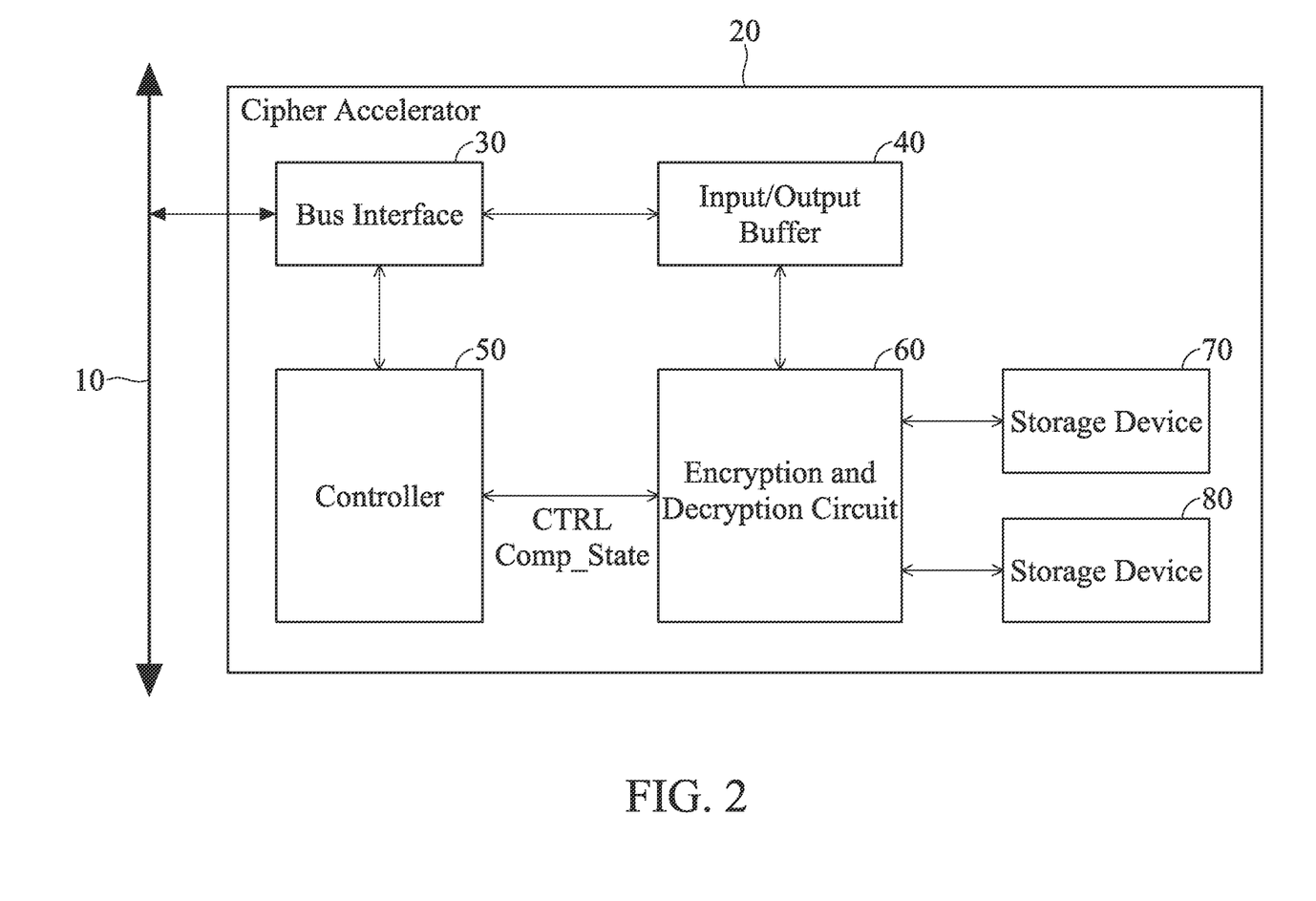
FIG. 2 shows a cipher accelerator according to some embodiments of the invention.

FIG. 2 shows a cipher accelerator 20 according to some embodiments of the invention. The cipher accelerator 20 is implemented in the IC for encrypting and decrypting data from other circuits via the bus 10 and transmitting the encrypted/decrypted data back to the original circuit or to other circuits.

The cipher accelerator 20 includes a bus interface 30, an input/output buffer 40, a controller 50, an encryption and decryption (encryption/decryption) circuit 60, a storage device 70, and a storage device 80. In some embodiments, the storage devices 70 and 80 may be memories or registers. The bus interface 30 is coupled to the bus 10. The bus interface 30 is configured to transmit the commands of other circuits on the bus 10 to the controller 50, and transmit the response provided by the controller 50 to the bus 10. In addition, the bus interface 30 is configured to transmit data to be encrypted or decrypted to the input/output buffer 40 and transmit the encrypted or decrypted data from the input/output buffer 40 to the bus 10.

In response to the command from the bus interface 30, the controller 50 is configured to provide a control signal CTRL to the encryption and decryption circuit 60, and the control signal CTRL includes finite state machine (FSM) information related to encryption and decryption operations. In some embodiments, the controller 50 is configured to provide the control signal CTRL with the FSM information corresponding to the normal mode or the FSM information corresponding to the differential fault analysis mode to the encryption and decryption circuit 60.

In the normal mode, the control signal CTRL is configured to only instruct the encryption and decryption circuit 60 to perform the normal encryption and decryption operations without performing redundant encryption and decryption operations, i.e., only the normal rounds NR are performed by the encryption and decryption circuit 60. Therefore, after completing the normal rounds NR, the encryption and decryption circuit 60 obtains the encrypted/decrypted data, and transmits the encrypted/decrypted data to the input/output buffer 40. Next, the encrypted/decrypted data is provided to the bus 10 via the bus interface 30 for other circuits to perform subsequent procedures.

In the differential fault analysis mode, in addition to the normal encryption and decryption operations, the control signal CTRL is configured to further instruct the encryption and decryption circuit 60 to perform the redundant encryption and decryption operations, i.e., the encryption and decryption circuit 60 is configured to further perform the redundant rounds RR. After completing the normal encryption and decryption operations and the redundant encryption and decryption operations, the encryption and decryption circuit 60 is configured to compare the operation results to determine whether the operation results of the normal encryption and decryption operations and the redundant encryption and decryption operations are the same. If the operation results of the normal encryption and decryption operations and the redundant encryption and decryption operations are inconsistent, the encryption and decryption circuit 60 is configured to provide the signal Comp_State to the controller 50, so as to notify the controller 50 that a fault occurs. On the contrary, if the operation results of the normal encryption and decryption operations and the redundant encryption and decryption operations are the same, the encryption and decryption circuit 60 is configured to transmit the encrypted/decrypted data to the input/output buffer 40. Therefore, the encrypted/decrypted data is provided to the bus 10 via the bus interface 30 for other circuits to perform subsequent procedures.

In the differential fault analysis mode, the result (state) generated during the normal encryption and decryption operations performed by the cipher accelerator 20 is stored in the storage device 70, and the result (state) generated during the redundant encryption and decryption operations performed by the cipher accelerator 20 is stored in the storage device 80. In addition, the number of redundant rounds RR required to perform the redundant encryption and decryption operations is less than the number of normal rounds NR required to perform normal encryption and decryption operations. In other words, the time required to perform the redundant encryption and decryption operations (i.e., the number of clock cycles) is less than the time required to perform the normal encryption and decryption operations (i.e., the number of clock cycles). Therefore, using the cipher accelerator 20 can speed up the differential fault analysis operation and reduce the required analysis time.

Figure 3:
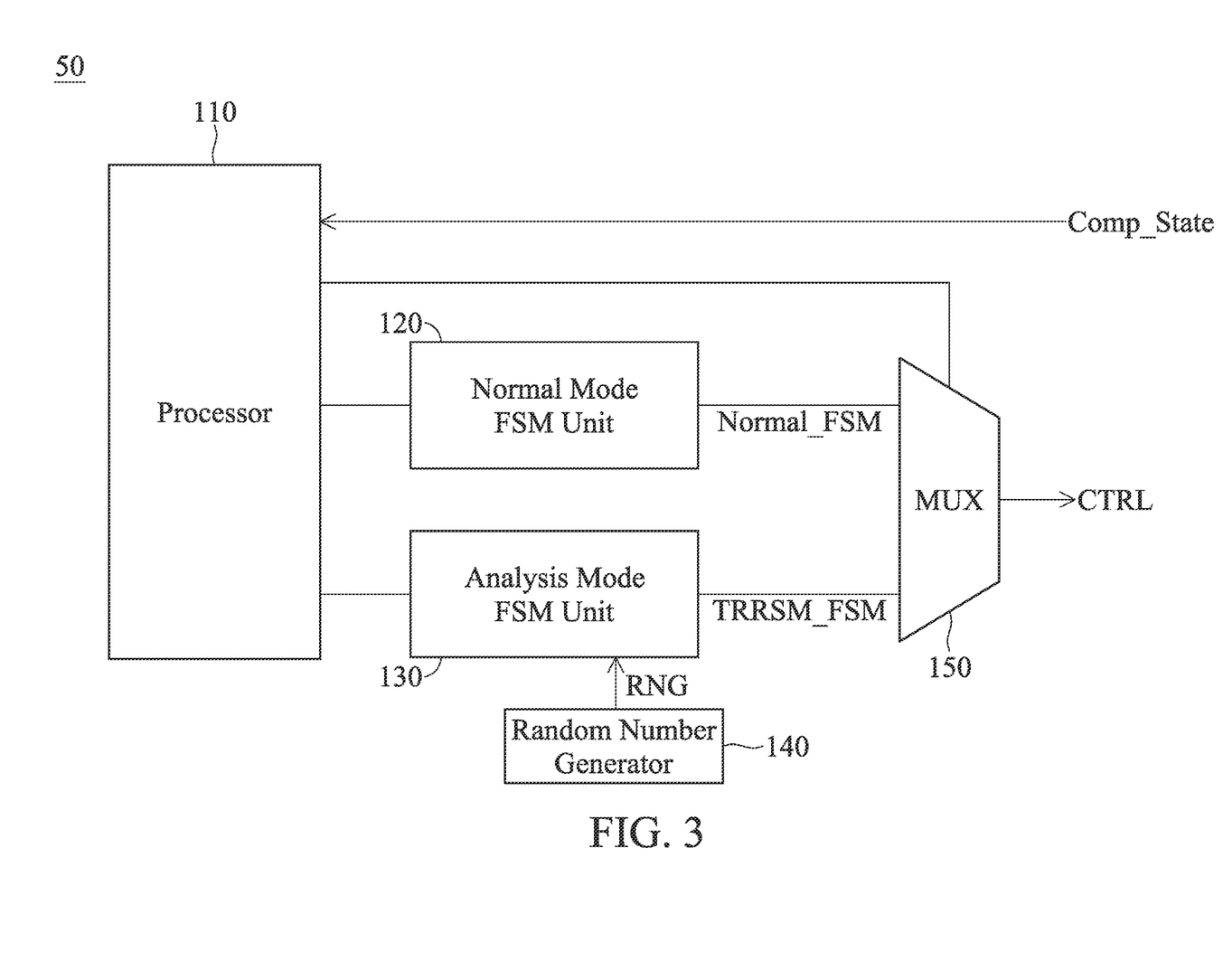
FIG. 3 shows the controller of FIG. 2 according to some embodiments of the invention.

FIG. 3 shows the controller 50 of FIG. 2 according to some embodiments of the invention. The controller 50 includes a multiplexer (MUX) 150, a processor 110, a normal mode FSM unit 120, an analysis mode FSM unit 130 and a random number generator 140. In FIG. 3, in order to simplify the description, only related circuits are described in the controller 50, and other circuits will be omitted.

In the normal mode, the processor 110 is configured to control the normal mode FSM unit 120 to generate the FSM information Normal_FSM corresponding to the normal encryption and decryption operations. Moreover, in the differential fault analysis mode, the processor 110 is configured to control the analysis mode FSM unit 130 to generate FSM information TRRSM_FSM corresponding to the normal encryption and decryption operations combined with the redundant encryption and decryption operations. It should be noted that the analysis mode FSM unit 130 is configured to provide the FSM information TRRSM_FSM according to the random variable value RNG from the random number generator 140. In addition, the number of redundant rounds RR required to perform the redundant encryption and decryption operations is determined by the random variable value RNG. In other words, the number of redundant rounds RR required to perform the redundant encryption and decryption operations each time is variable.

Referring to FIG. 2 and FIG. 3 together, in the normal mode, the processor 110 is configured to control the multiplexer 150 to select the FSM information Normal_FSM from the normal mode FSM unit 120 as the control signal CTRL. Furthermore, in the differential fault analysis mode, the processor 110 is configured to control the multiplexer 150 to select the FSM information TRRSM_FSM from the analysis mode FSM unit 130 as the control signal CTRL.

As described above, in the differential fault analysis mode, the encryption and decryption circuit 60 is configured to determine whether the operation results of the normal encryption and decryption operations and the redundant encryption and decryption operations are consistent, and provide the signal Comp_State to the controller 50 to notify the controller 50 whether a fault occurs. When the signal Comp_State indicates that a fault occurs, the processor 110 is configured to control the analysis mode FSM unit 130 to generate the FSM information TRRSM_FSM again, so as to control the encryption and decryption circuit 60 to perform the normal encryption and decryption operations and the redundant encryption and decryption operations again. In some embodiments, when the signal Comp_State indicates that a fault occurs, the processor 110 is configured to directly finish the encryption and decryption operations, and inform other circuits (e.g., by sending a specific value) that the encryption and decryption processes are attacked and the operation fails.

Figure 4:
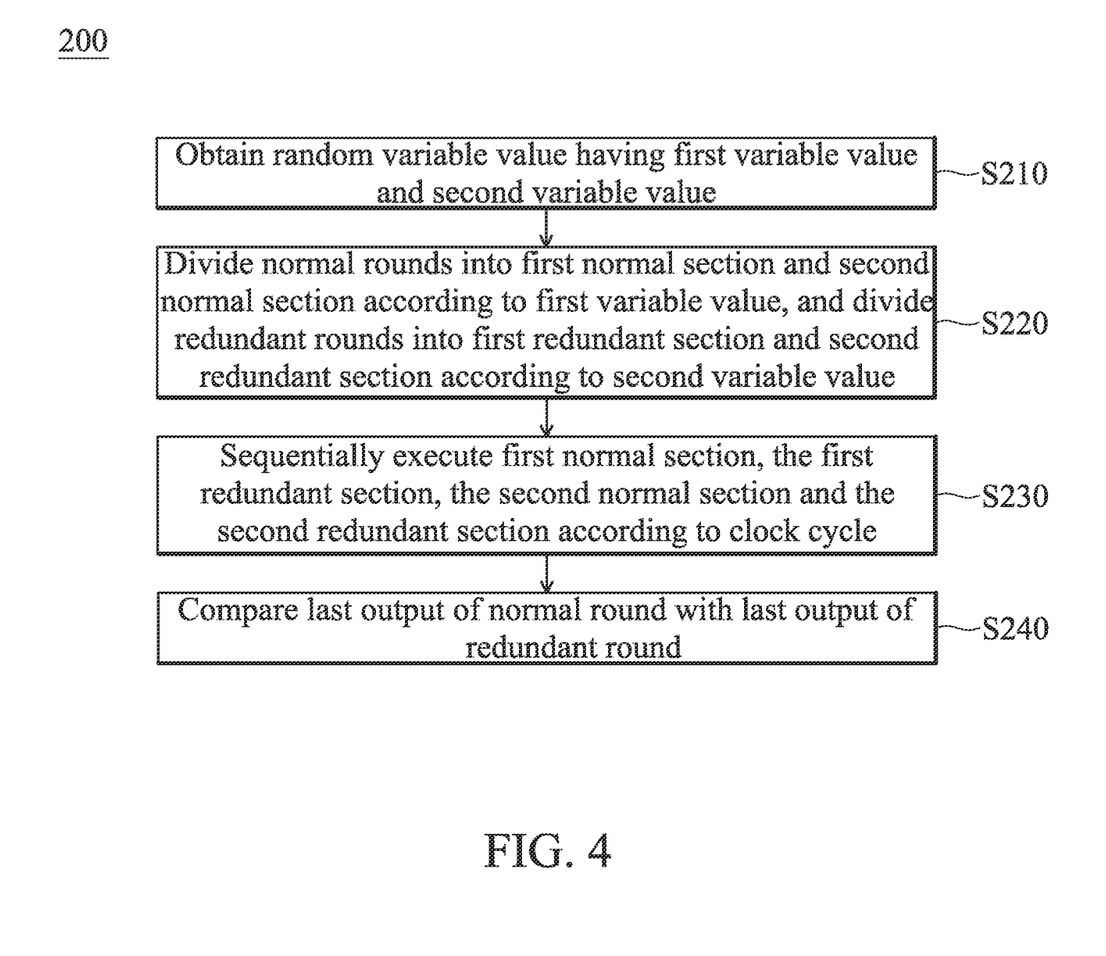
FIG. 4 shows a differential fault analysis method for performing encryption and decryption operations according to some embodiments of the invention.
Figure 5:
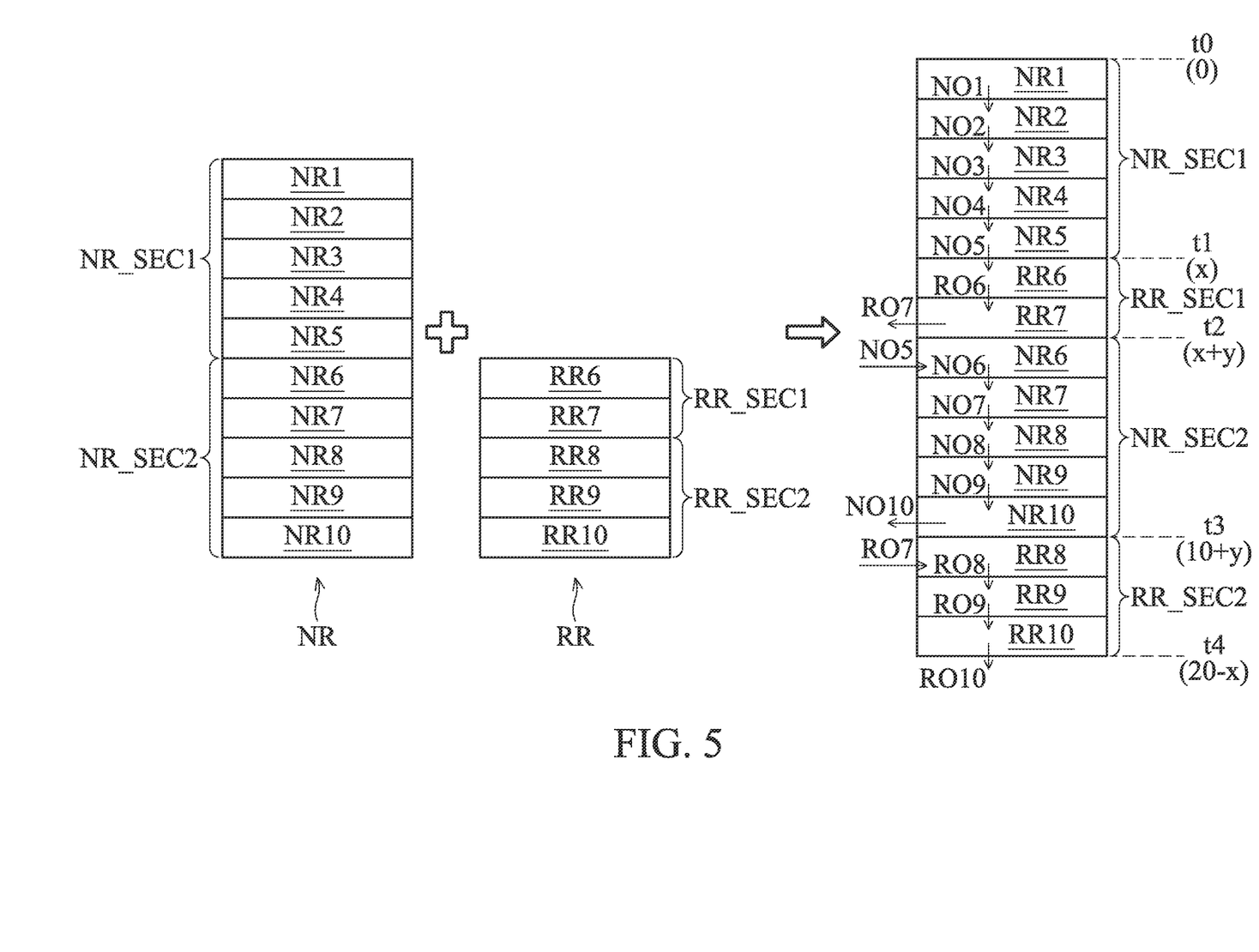
FIG. 5 shows a schematic diagram illustrating an encryption and decryption algorithm performed using the differential fault analysis method of FIG. 4 according to some embodiments of the invention.

FIG. 4 shows a differential fault analysis method 200 for performing encryption and decryption operations according to some embodiments of the invention. According to the differential fault analysis method 200, the cipher accelerator 20 is configured to provide the FSM information TRRSM_FSM with a timing redundancy random swapping mechanism to perform the differential fault analysis. FIG. 5 shows a schematic diagram illustrating an encryption and decryption algorithm performed using the differential fault analysis method 200 of FIG. 4 according to some embodiments of the invention. For the convenience of description, it is assumed that the total number of normal rounds NR in FIG. 5 is 10, i.e., the encryption and decryption operations need to perform the normal rounds NR1 through NR10.

Referring to FIG. 4 and FIG. 5 together, first, in step S210, a random variable value RNG is obtained. The random variable value RNG includes a first variable value x and a second variable value y. When the total number of normal rounds NR is 10, the first variable value x may be a random value between integer 1 and integer 7 (i.e., $1 \leq x \leq 7$), and the second variable value y may be a random value between 0 and integer obtained by subtracting the first variable value x from the integer 10 (i.e., $0 \leq y \leq (10-x)$). In such embodiment, it is assumed that the first variable value x is 5 (i.e., x=5) and the second variable value y is 2 (i.e., y=2). Furthermore, the sum of the first variable value x and the second variable value y is less than or equal to the total number of normal rounds NR (i.e., $x+y \leq 10$).

In step S220, according to the first variable value x, the normal rounds NR1 through NR10 are divided into a first normal section NR_SEC1 and a second normal section NR_SEC2. As shown in FIG. 5, the first normal section NR_SEC1 includes the normal rounds NR1, NR2. NR3, NR4 and NR5, and the second normal section NR_SEC2 includes the normal rounds NR6, NR7, NR8, NR9 and NR10. Furthermore, according to the first variable value x and the total number of normal rounds NR, it can be obtained that the number of redundant rounds RR is 5 (i.e., 10−x=5). It should be noted that the operation of each redundant round RR is the same as the corresponding normal round NR. For example, the operations of redundant rounds RR6, RR7, RR8, RR9, and RR10 correspond to the operations of normal rounds NR6, NR7, NR8, NR9, and NR10, respectively. In other words, the number of redundant rounds RR6 through RR10 is the same as the number of normal rounds NR6 through NR10 in the second normal section NR_SEC2, and the operations of the redundant rounds RR6 through RR10 is the same as that of the second normal section NR_SEC2.

Next, according to the second variable value y, the redundant rounds RR6 through RR10 are divided into a first redundant section RR_SEC1 and a second redundant section RR_SEC2. As shown in FIG. 5, the first redundant section RR_SEC1 includes the redundant rounds RR6 and RR7, and the second redundant section RR_SEC2 includes the redundant rounds RR8, RR9 and RR10.

In step S230, the analysis mode FSM unit 130 is configured to generate the FSM information TRRSM_FSM, so as to control the encryption and decryption circuit 60 to sequentially execute the first normal section NR_SEC1, the first redundant section RR_SEC1, the second normal section NR_SEC2 and the second redundant section RR_SEC2.

As shown in FIG. 5, the normal round NR1 of the first normal section NR_SEC1 is executed first to obtain the output NO1, and the output NO1 is stored in the storage device 70. Next, the output NO1 of the normal round NR1 is substituted into the normal round NR2 for calculation to obtain the output NO2, and the output NO2 is stored in the storage device 70. Thus, the state stored in the storage device 70 resulting from the normal encryption and decryption operations will be updated to the output NO2. By analogy, the normal rounds NR3 to NR5 are executed in sequence, and the outputs NO3 to NO5 are generated respectively. In addition, the state stored in the storage device 70 and generated by performing normal encryption and decryption operations, is sequentially updated to the output NO3, NO4 and NO5. Thus, the first normal section NR_SEC1 is completed.

In some embodiments, after completing the normal round NR5, in addition to storing the output NO5 in the storage device 70, the encryption and decryption circuit 60 is configured to further store the output NO5 in the storage device 80.

After completing the first normal section NR_SEC1, the encryption and decryption circuit 60 is configured to substitute the output NO5 into the redundant round RR6 of the first redundant section RR_SEC1 for operation to obtain the output RO6, and store the output RO6 in the storage device 80. Thus, the state stored in the storage device 80 is updated to the output RO6. Next, the output RO6 of the redundant round RR6 is substituted into the redundant round RR7 for calculation to obtain the output ROT and the output RO7 is stored in the storage device 80. Thus, the state stored in the storage device 80 resulting from the redundant encryption and decryption operations is updated to the output RO7. Thus, the first redundant section RR_SEC1 is completed.

After completing the first redundant section RR_SEC1, the encryption and decryption circuit 60 is configured to substitute the output NO5 stored in the storage device 70 into the normal round NR6 of the second normal section NR_SEC2 for operation to obtain the output NO6, and the output NO6 is stored in the storage device 70. Next, the output NO6 of the normal round NR6 is substituted into the normal round NR7 for calculation to obtain the output NO7, and the output NO7 is stored in storage device 70. By analogy, the normal rounds NR8 to NR10 are executed in sequence, and outputs NO8 to NO10 are generated respectively. In addition, the state stored in the storage device 70 generated by performing normal encryption and decryption operations is sequentially updated to the output NO8, NO9 and NO10. Then, the second normal section NR_SEC2 is completed, and the state stored in the storage device 70 resulting from performing the normal encryption and decryption operations is finally updated to output NO10.

After the second normal section NR_SEC2 is completed, the encryption and decryption circuit 60 is configured to substitute the output RO7 stored in the storage device 80 into the redundant round RR8 of the second redundant section RR_SEC2 for operation to obtain the output RO8, and the output RO8 is stored in the storage device 80. Next, the output RO8 of the redundant round RR8 is substituted into the redundant round RR9 for calculation to obtain the output RO9, and the output RO9 is stored in the storage device 80. Next, the output RO9 of the redundant round RR9 is substituted into the redundant round RR10 for calculation to obtain the output RO10, and the output RO10 is stored in the storage device 80. Thus, the state stored in the storage 80 and generated by the redundant encryption and decryption operations is finally updated to the output RO00. Thus, the second redundant section RR_SEC2 is completed.

Referring back to the differential fault analysis method 200, in step S240, the encryption and decryption circuit 60 is configured to compare whether the last output NR10 of the normal round NR stored in the storage device 70 with the last output RR10 of the redundant round RR stored in the storage device 80 are consistent. If the output NR10 is the same as the output RR10, the encryption and decryption circuit 60 is configured to complete the encryption and decryption operations according to the output NR10, and provide the encrypted/decrypted data to the input/output buffer 40 for transmission to the bus 10 via the bus interface 30. Conversely, if the output NR10 is different from the output RR10, the encryption and decryption circuit 60 is configured to provide the signal Comp_State to the controller 50 to notify the controller 50 that a fault has occurred.

In FIG. 5, the first normal section NR_SEC1 is executed at time t0 (e.g., t0=0). Next, the first redundant section RR_SEC1 is executed at time t1 (e.g., t1=x). Next, the second normal section NR_SEC2 is executed at time t2 (e.g., t2=x+y). Next, the second redundant section RR_SEC2 is executed at time t3 (e.g., t3=−0+y). Finally, the execution of the second redundant section RR_SEC2 ends at time t4 (e.g., t4=20-y). In other words, the normal rounds NR and the redundant rounds RR are executed interactively. In addition, only the second half of redundant rounds RR (e.g., redundant rounds RR6 through RR10) need to be executed. Compared with the traditional differential fault analysis that needs to perform all redundant rounds RR (e.g., the redundant rounds RR1 through RR10) or needs to add an additional random cycle/idle cycle, only a section of the redundant rounds RR are performed in the embodiments of the invention, thereby decreasing the analysis time.

In the embodiments of the invention, the respective end times of the normal round NR and the redundant round RR are protected by the random variable value RNG. For example, the first variable value x is used to protect the end time of the redundant round RR (e.g., the end time of the redundant round RR10), and the second variable value y is used to protect the end time of the normal round NR (e.g., the end time of the normal round NR10). Since the end time of the redundant round RR and the end time of the normal round NR are determined by different variable values (such as the first variable value x and the second variable value y), the difficulty of the attack is increased. Compared with the traditional differential fault analysis in which the redundant rounds RR and/or the normal rounds NR have a fixed end time, it is avoided that the attacker can create the same fault at the critical time point of the normal rounds NR and the redundant rounds RR in the embodiments of the invention, thereby improving time redundancy mechanism.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A cipher accelerator, comprising:
   an encryption and decryption circuit configured to perform an encryption and decryption operation according to a control signal, wherein the encryption and decryption operation comprises a plurality of normal rounds and a plurality of redundant rounds;
   a controller configured to provide the control signal to the encryption and decryption circuit according to a first variable value and a second variable value, so as to control execution order of the plurality of normal rounds and the plurality of redundant rounds;
   a first storage device configured to store state of executing the plurality of normal rounds; and
   a second storage device configured to store state of executing the plurality of redundant rounds,
   wherein the encryption and decryption circuit is configured to divide the plurality of normal rounds into a first normal section and a second normal section according to the first variable value of the control signal, and divide the plurality of redundant rounds into a first redundant section and a second redundant section according to the second variable value of the control signal,
   wherein the number of the plurality of normal rounds is greater than the number of the plurality of redundant rounds,
   wherein the encryption and decryption circuit is configured to sequentially perform the first normal section, the first redundant section, the second normal section, and the second redundant section.

2. The cipher accelerator as claimed in claim 1, wherein operations of the plurality of redundant rounds are the same as operations of the second normal section.

3. The cipher accelerator as claimed in claim 1, wherein the number of the plurality of redundant rounds is the same as the number of the plurality of normal rounds in the second normal section.

4. The cipher accelerator as claimed in claim 1, wherein the end time of the plurality of normal rounds is determined by the second variable value, and the end time of the plurality of redundant rounds is determined by the first variable value.

5. The cipher accelerator as claimed in claim 1, wherein when the encryption and decryption circuit sequentially executes each of the plurality of normal rounds of the first normal section until a first normal round, the encryption and decryption circuit is configured to store a first state corresponding to the first normal round to the first storage device, and to execute the first redundant section according to the first state.

6. The cipher accelerator as claimed in claim 5, wherein when the encryption and decryption circuit sequentially executes each of the plurality of redundant rounds of the first redundant section according to the first state until a first redundant round, the encryption and decryption circuit is configured to store a second state corresponding to the first redundant round into the second storage device, and to execute the second normal section according to the first state stored in the first storage device.

7. The cipher accelerator as claimed in claim 6, wherein when the encryption and decryption circuit sequentially executes each of the plurality of normal rounds of the second normal section according to the first state until a second normal round, the encryption and decryption circuit is configured to store a third state corresponding to the second normal round to the first storage device, and to sequentially execute the second redundant section according to the second state stored in the second storage device.

8. The cipher accelerator as claimed in claim 7, wherein when the encryption and decryption circuit sequentially executes each of the plurality of redundant rounds of the second redundant section according to the second state until a second redundant round, the encryption and decryption circuit is configured to store a fourth state corresponding to the second redundant round in the second storage device.

9. The cipher accelerator as claimed in claim 8, wherein when the third state of the first storage device is the same as the fourth state of the second storage device, the encryption and decryption circuit is configured to determine that the encryption and decryption operation is successful.

10. The cipher accelerator as claimed in claim 1, wherein the controller comprises:
   a random number generator configured to provide the first variable value and the second variable value,
   wherein the number of the plurality of redundant rounds is determined by the first variable value,
   wherein a sum of the first variable value and the second variable value is less than or equal to the number of the plurality of normal rounds.

* * * * *